Fig. 2

INVENTORS
MAURICE HOFFER,
ANDRE ULDRY,
ERNEST ACKERMANN,
AND
JEAN-JACQUES ROISSARD DE BELLET
BY Irvin S. Thompson
ATTORNEY

May 26, 1970  M. HOFFER ET AL  3,514,509
METHOD OF PRODUCING THIN WALLED CONTAINERS
OF THERMOFORMABLE PLASTIC
Filed Aug. 29, 1967                            7 Sheets-Sheet 7

FIG. 14

INVENTORS.
MAURICE HOFFER
ANDRE ULDRY
ERNEST ACKERMANN
JEAN-JACQUES R. DE BELLET
BY
*James C. Logomasini*
ATTORNEY:

United States Patent Office 3,514,509
Patented May 26, 1970

3,514,509
METHOD OF PRODUCING THIN WALLED CONTAINERS OF THERMOFORMABLE PLASTIC
Maurice Hoffer, 16 Plateau de Champel, Geneva, Switzerland; Ernest Ackermann, 14 Avenue de Thonex, Chene-Bourg, Geneva, Switzerland; Jean-Jacques Roissard de Bellet, 21 Chemin de Conches, Conches, Geneva, Switzerland; and André Uldry, 6b Avenue de Thonex, Chene-Bourg, Geneva, Switzerland
Continuation-in-part of application Ser. No. 226,834, Sept. 26, 1962. This application Aug. 29, 1967, Ser. No. 668,126
Claims priority, application Switzerland, Oct. 9, 1961, 11,688/61
Int. Cl. B29c 17/04; B29d 23/03
U.S. Cl. 264—89
5 Claims

ABSTRACT OF THE DISCLOSURE

A method of thermoforming thin-walled plastic containers by means of a deforming plug having special surface characteristics, operating in conjunction with a controlled reverse flow of gaseous fluid, in order to restrain the plastic material during the forming operation, and thereby produce a container having an optimum material distribution pattern. Container configurations having body portions greater than the die opening may be formed and efficiently released from the die by means of container wall defining segments which are radially movable within the die cavity.

---

This application is a continuation-in-part of copending application Ser. No. 226,834, filed Sept. 26, 1962.

The present invention relates generally to a new and useful method of forming plastic containers, and more particularly to a sheet thermoforming method of controlling plastic distribution in formed containers.

Plug assist or plunger drawing thermoforming processes are well-known in the art. Many U.S. patents cover this field beginning with No. 2,282,423 to Kopitke, who pioneered plunger assist operations, followed by many others, e.g. Nos. 2,891,280 and 2,962,758 to Politis No. 3,025,566 to Kostur, and No. 2,910,728 to Rowe, all of which generally teach deforming a heated sheet with an advancing plug using a fluid pressure at completion of the plug stroke to expand the sheet against the die cavity wall. Plug assist plastic thermoforming opened up the area of plastic sheet shaping, which was previously generally limited to vacuum forming. These systems are good, but are becoming more and more limited in the highly competitive plastics industry, since it is well-known that each container is only as good as its thinnest part. As a result of the need to reduce plastic usage while improving the overall structure of the container, a variety of systems were developed. For example, U.S. Pat. No. 3,167,104 to Wiley et al. discloses a system whereby thin containers are formed using a recessed punch and sheet hermetically sealed across the die. Hermetic sealing is considered essential in this forming operation. U.S. Pat. No. 2,973,558 shows the formation of a container by initially prestretching the sheet with air, and then using specially heated air to force the sheet into the die against air emanating from the die. These systems have improved the overall uniformity of the drawing operation to some extent but unfortunately are limited to either forming specific container configurations, or still require more plastic material than would be necessary if the material distribution of the container could be controlled. This is so because no system has been developed to date to control the incremental movement of the sheet during the actual drawing operation. It has now been found that such incremental sheet movement can be controlled by using a special punch in conjunction with a countercurrent flow of gaseous fluid.

It is, therefore, a principal object of the present invention to provide a process for controlling the pattern of sheet stretching in a thermoforming operation.

It is a further object of the present invention to provide a flexible process for restraining sheet stretching during a thermoforming drawing operation, in order to obtain a predetermined material thickness pattern throughout the wall of a container being formed.

It is a particular object of the present invention to provide an improved molding process for producing containers having walls with negative angles, or restricted cross-sections.

It is another object of the present invention to provide an improved method for severing the containers from the sheet during the forming operation.

It is a further object of the present invention to provide a flexible process for thermoforming containers wherein the total weight of material in the container can be changed by varying the process operating conditions.

It is an additional object of the present invention to provide an efficient thermoforming process for the economical manufacture of thin-walled thermoplastic containers, wherein cycle time is reduced by minimizing the necessary movements of the container forming parts of the installation.

These and other objects are realized by a sheet thermoforming method of making a thin-walled container which involves utilizing a special mechanical deforming plug having certain frictional surface characteristics, and a pressurized flow of gaseous fluid emanating from the die, which cooperate to restrain movement and control the extent of stretching of the plastic during the drawing process. More specifically, the process comprises initially heating a thermoplastic sheet to render it thermoformable, then mechanically deforming the heated sheet by means of a special plug having a surface coefficient of static friction between about 0.3 to 2.0. The sheet during this deformation is placed over the plug entry end of a die cavity having a shape generally conforming to that of the finished container. As a critical part of the present invention, a continuous flow of gaseous fluid is introduced into the die cavity and permitted to flow out of the die so as to maintain the die cavity pressure between about 3 to 75 p.s.i.g., preferably 5 to 40 p.s.i.g. This flow of gaseous fluid is initiated preferably simultaneous with, or shortly after initial contact of the plug with the sheet, and serves to force the thermoplastic sheet in a direction opposite to the plug movement so as to progressively apply it against the plug face during its advance into the die cavity. The fluid pressure acting on the sheet together with the plug surface having the above-mentioned surface characteristics tends to anchor the sheet in place one it has contacted the plug, thereby tending to restrain stretching movement of the sheet along the plug surface as the plug advances further into the die. As the die pressure is varied between about 3 to 75 p.s.i.g., preferably 3 to 40 p.s.i.g., the extent of this slip restriction during the plug stroke varies, and herein lies the flexibility in material distribution which is achieved by the process of the present invention. In addition, the flow of gaseous fluid through the die also helps to keep the sheet from contacting the die cavity. The die is preferably maintained at a low temperature, until the container is finally formed. This fluid flow further permits control of the overall container weight (sheet utilization) since the extent to which the sheet is forced against the plug and away from the entry edge of the die as the plug advances, may be varied depending on the volume rate of the gaseous fluid flowing through the die.

When the plug in the present process has progressed some distance into the die, a second gaseous fluid is injected through the plug on the opposite side of the sheet at a pressure greater than that in the die cavity, while permitting the gaseous fluid in the die to be driven from the cavity by the pressure of this inner gas, so as to strip the partially formed container off of the plug surface and force it against the cool cavity wall to finish form the container. An improved method for achieving this stripping is to introduce the fluid through the plug close to its base so that the gaseous fluid will progress downwardly along the plug to evenly strip the partially formed container off of its surface.

Continuous manufacture may be achieved by providing the thermoplastic in the form of a strip with an unused portion positioned between the plug and die by driving means after each cycle of operation.

It is preferred in the present process that the portion of the sheet from which the container is formed be severed during the molding cycle, i.e., during the container forming stroke of the plug. Problems sometimes arise in this area in that the force of a fixed knife edge against a rigid die top requires extremely tight tolerances to effectively sever without cracking or dulling the knife edge. As an added feature of the invention, the problem has been resolved by a rather unique clamping mechanism which contacts the sheet periphery around the die mouth before the knife contacts the sheet in order to help dampen the action of the knife as it strikes the sheet. Of possibly greater importance the spring mounting provides for uniform peripheral gripping by the clamping edge during the final stages of container expansion. This is important to prevent portions of the severed sheet from being drawn into the die.

As an additional special, and rather unique feature of the present invention, the container die well may be equipped with spring biased radially movable segments within the well which permit axial ejection from the die of a formed container having body portions of varying cross-sections, (e.g., reversed frustro-conical) without the need for full radial or axial opening of mating die parts for each forming cycle. More specifically, pressure controlled segments within the die well when contracted or peripherally drawn together internally define the shape of the container and when expanded permit the container to be ejected from the die well. Radial movement may be achieved by the application of an axial force to the frontal face of the die.

In describing the overall invention, reference will be made to preferred embodiments illustrated in the accompanying drawings in which.

Figure 1:
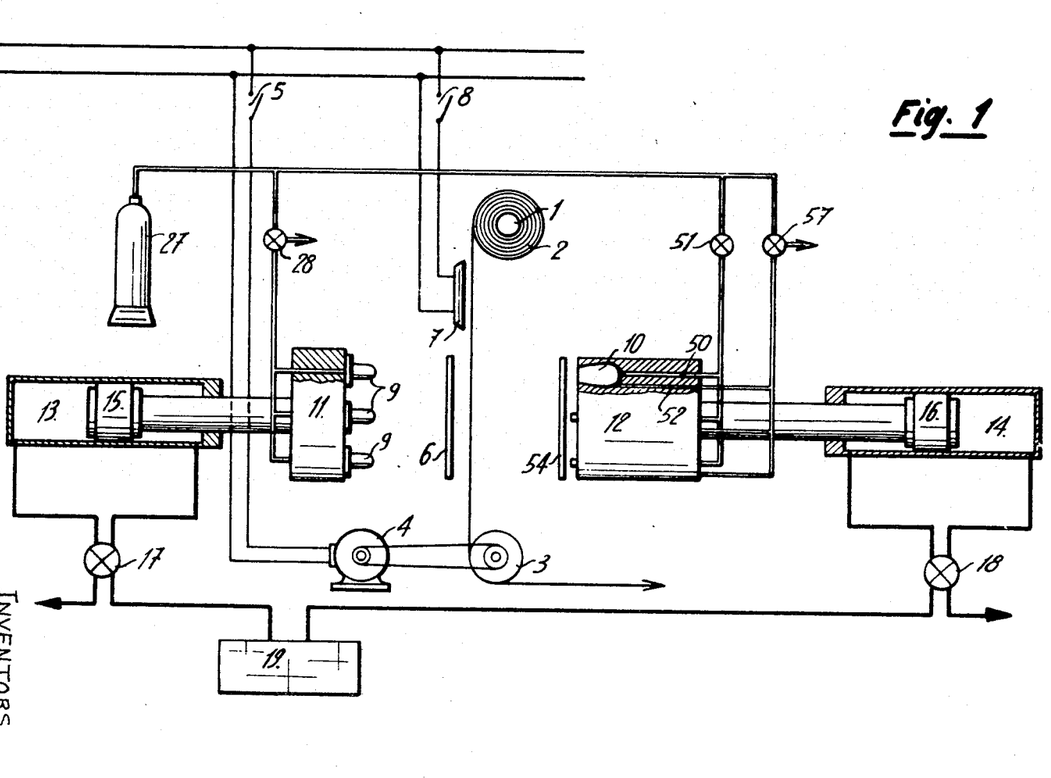
FIG. 1 is a schematic drawing indicating the main electromechanical pneumatic linkages existing between the various parts of the installation.

Referring now to the drawings wherein identical numerals refer to identical parts, there is shown an installation in FIG. 1 to carry out the described method. This installation comprises a thermoforming apparatus having a positioning device for the sheet of thermoformable material and a heating device for at least one part of this sheet of plastic material. These positioning and heating devices are well-known and are illustrated very schematically in FIG. 1.

In the example shown, the positioning device comprises a step-by-step driving device and a fixing gate for the sheet. The driving device has a support 1 intended to receive a roll 2 of sheet plastic material as well as driving means 3, for driving the said sheet and rotated by means of an electric motor 4, the operation of which is manually controlled by means of a switch 5. Known means are provided to stretch the plastic material between roller 2 and driving means 3.

The fixing gate 6 makes it possible to maintain the sheet of plastic material F in a fixed position during the forming of at least certain parts of it.

The heating device for the sheet F of plastic material comprises heating bodies 7, for example infra-red heaters located along the said sheet F, the operation of which is controlled by switch 8.

This installation comprises further, like other known thermoforming installations, at least one plug 9 and at least one die 10 cooperating the one with the other and located on either side of the sheet F of plastic material. In the example shown these plugs 9 and these dies 10 are carried by male 11 and female 12 mold-carrying blocks, respectively. In the example shown, these male 11 and female 12 mold-carrying blocks are slidingly mounted with respect to the frame of the thermoforming installation in a horizontal plane.

Each of these mold-carrying blocks 11, 12 is provided with an actuating device making it possible to displace it from an inactive withdrawn position to a forward position when the plugs 9 are engaged in the corresponding dies 10. These actuating devices in the example shown comprise hydraulic double effect jacks 13, 14, respectively, the pistons 15, 16 of which are respectively fast with the mold-carrying blocks 11, 12. These jacks 13, 14 are alternately connected through valves 17, 18, respectively, to a container 19 of fluid under pressure and to discharge.

Valves 17, 18 permit control of the direction of displacement of the corresponding mold-carrying blocks, and also control the speed of displacement by controlling the flow rate of the fluid under pressure.

This installation differentiates in some respects from known existing installations by the fact that each plug 9 and each die 10 is provided with an injection device for a gaseous fluid. It comprises further a device for controlling, among other things, the amplitudes and speeds of the relative displacements of the male and female-mold carrying blocks with respect to the sheet of plastic material, according to the desired shape of the finished container and the composition of the plastic material used, as well as controlling the gaseous fluid feeding of the injection devices of the plugs and the dies.

Figure 2:
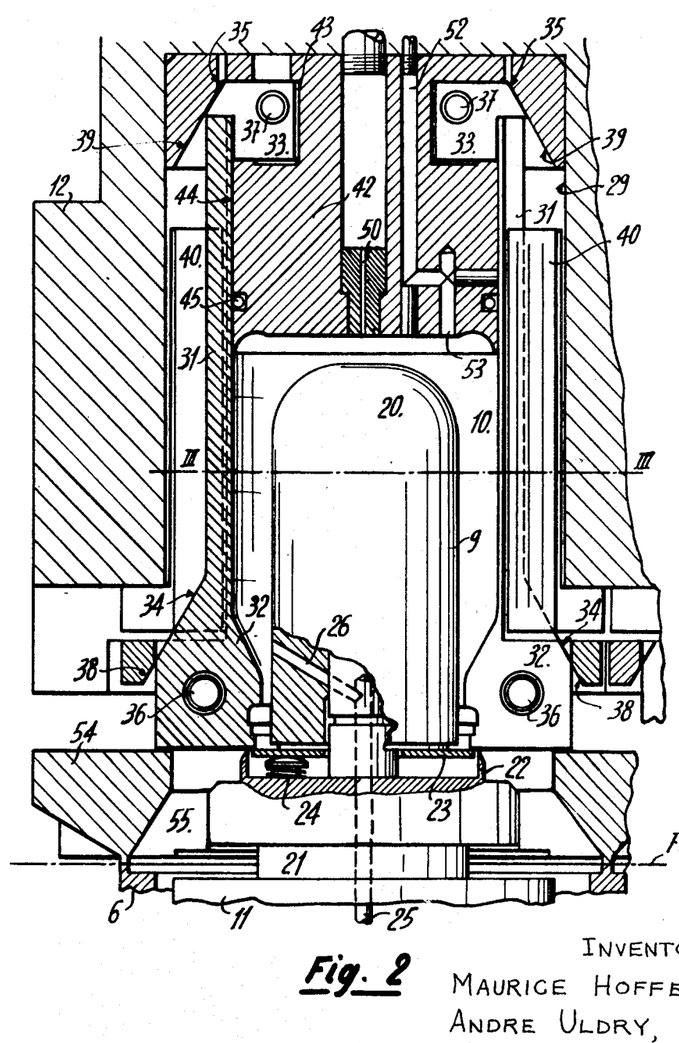
FIG. 2 is a cross-sectional view taken along the line II—II of FIG. 3, showing a punch and a die.

FIG. 2 shows one of the plugs 9 and one of the dies 10 carried by the corresponding mold-carrying blocks 11, 12. As a critical part of this invention, each plug 9 comprises a head 20 of a special material having special surface characteristics as typified by a static coefficient of friction between about 0.3 to 2.0, this range being based on dry, unlubricated material on themselves. Material such as wood or epoxyline or polyester resins for example may be surface finished to produce the desired plug, with pear wood being the preferred material. This head 20 is axially displaceable with respect to a support 21 fast with the mold-carrying block 11. The stroke of the axial displacement of the head 20 depends in particular on the shape of the container to be formed, and on the thickness of the sheet of plastic material out of which the container is manufactured.

Each plug 9 further comprises a cutting device comprising a circular knife 22 fixed on the support 21, the edge of which is located in a plane perpendicular to the axis of the punch. A thin flat clamping ring 23 is provided which is axially displaceable with respect to the support 21 against the resilient action of spring means 24, which, in the example shown, tends to maintain this washer against the rear frontal face of the head 20. The clamping ring 23 is normally located in a plane perpendicular to the axis of the punch, located before that plane in which the edge of the knife 22 is located. This spring-biased clamping ring serves to maintain the plastic material in position with respect to the frontal face of the die during the final stage of the forming operation. Each punch is further provided with a gaseous fluid injection device comprising a feeding duct 25 coaxial with the support 21, giving access to one or several nozzles 26 located at the base of the head 20 of the punch. The dimensions, the number and the disposition of these nozzles 26 are chosen in order to insure a homogeneous flow distribution of the gaseous fluid around the punch. It is preferred that the gaseous fluid be introduced through the plug in its base area as shown in FIG. 2 to ensure uniform stripping of the partially formed container away from the plug surface. The feeding duct 25 is connected to a source of gaseous fluid under pressure 27 by means of a valve 28 making it possible to control the flow of the said gaseous fluid.

Each die 10 is disposed inside a bore 29 of the female mold-carrying block 12 centered on the corresponding punch 9.

Figures 3, 4, 5, 6:
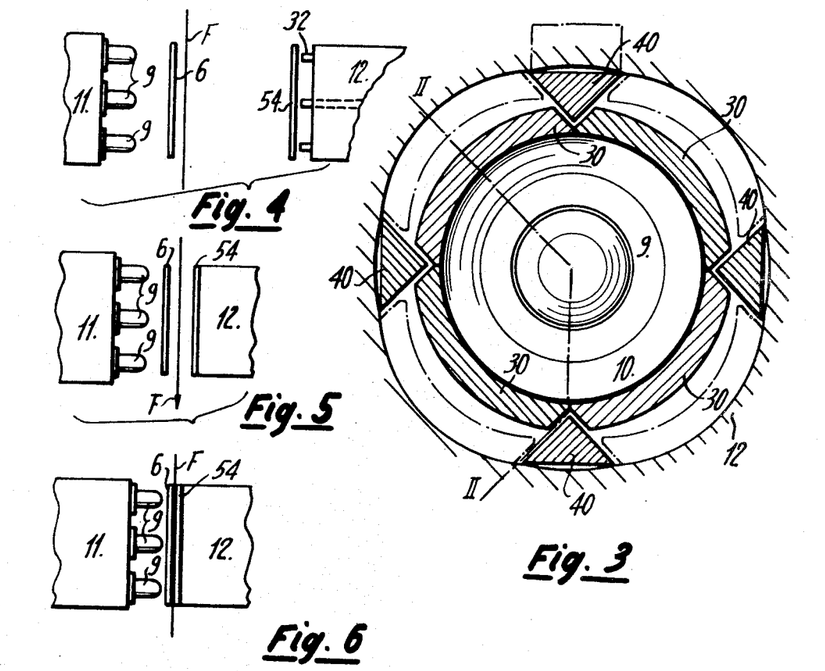
FIG. 3 is a cross-sectional view of the die taken along the line III—III of FIG. 2.
FIGS. 4 to 8 show different relative positions of the punches and dies of an installation during a container forming cycle.
Figure 14:
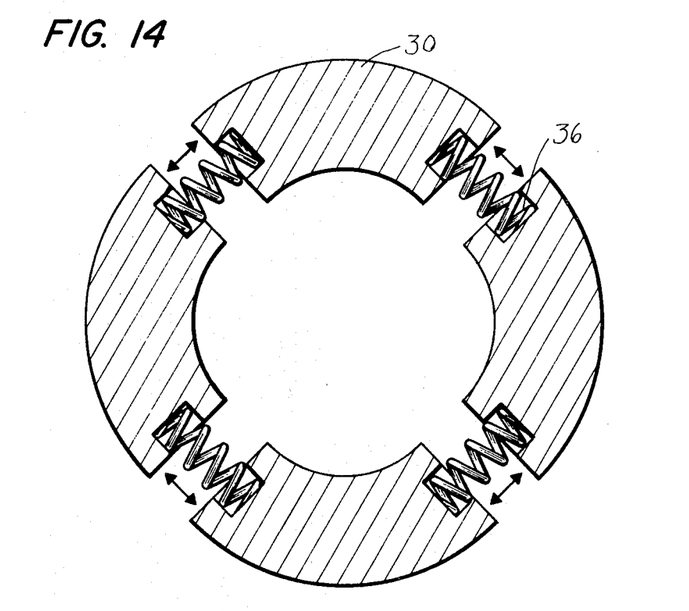
FIG. 14 is a schematic view taken along the line XIV—XIV of FIG. 13.

In the example shown, each die is formed by radially movable container wall defining segments comprising four parts or segments 30 having in transverse cross-section the general shape of a ring sector, as depicted in FIGS. 3 and 14. Each part 30 comprises a middle cylindrical portion 31 of relatively small thickness, and fore and rear portions 32, 33, respectively, of greater thickness and comprising a conical outside surface 34, 35, respectively. These conical surfaces 34, 35, are maintained, by means of springs 36, 37 disposed respectively between the portions 32, 33 of adjacent segments 30, and tending to separate parts 30 from each other, and to urge portions 32, 33 axially outwardly and into contact with conical surfaces 38, 39, respectively, fastened with the mold-carrying block 12. Guides 40 connected to the mold-carrying block 12 maintain the segments 30 in their desired radial positions.

The die thus provided is able to expand radially, the segments 30 being able to pass from their first or service position, illustrated in full lines at FIG. 3 where they define a cavity the shape of which corresponds to that desired to impart to a container, to a second or extracting position, illustrated in dotted lines in FIG. 3. This radial expansion of the die is obtained by an axial displacement of the segments 30 along surfaces 38, 39 with respect to the mold-carrying block 12. In the open rest position, the die is maintained in its extraction, expanded position, under the action of the springs 36, 37.

Each die 10 comprises further a bottom 42 of general cylindrical shape and having an annular groove 43 in which the rear portions 33 of the segments 30 are engaged, thus rendering this bottom 42 axially fastened to said segments 30.

In the closed, service position, of the die, the rear extremity of the middle portions 31 of the segments 30 are applied against the cylindrical peripheral surface 44 of the said bottom 42. The tightness between these segments 30 and the bottom 42 is insured for example by a seal 45. Each die comprises further an ejection device which in the embodiment shown is provided by a duct 50 connected through the intermediary of a valve 51 to a source of gaseous fluid under pressure.

Further, each die comprises a gaseous fluid injection device comprising a feeding duct 52 provided in the bottom 42 and connected through the intermediary of a valve 54 to the gaseous fluid source 27. This duct 52 feeds gaseous fluid to one or several nozzles 53 providing access to the cavity of the die. The number, the dimensions, and the disposition of these nozzles 53 are chosen in such a manner as to obtain a homogeneous flow distribution of the gaseous fluid along the walls of the cavity of the die.

The thermoplastic installation comprises further a closing plate 54 situated between the plugs and the dies. This closure plate 54 is pierced with bores 55 enabling the plugs to pass therethrough. During the feeding stroke of the female mold-carrying block 12 the frontal faces of the segments 30 of the die come in contact with one of the faces of the said closure plate provoking an axial, contraction displacement of these segments 30 with respect to the female mold-carrying block 12, causing the die in turn to be placed in its service position. That is to say, segments 30 wedge one against the other and against the bottom 43 respectively in order to define the cavity the shape of which corresponds to that of the container which is to be manufactured.

The installation according to the invention further comprises at least a device for controlling, among other things, the amplitudes and speeds of the relative displacements of the plugs and of the dies with respect to the sheet of plastic material, in accordance with the desired shape of the container to be formed, and the composition of the plastic material used, as well as controlling the gaseous fluid feeding of the injection devices of the plugs and of the dies.

In the example shown this control device is manual and comprises valves 17, 18 making it possible to control the amplitudes and the speeds of the relative displacements of the male and female mold-carrying blocks 11 and 12, respectively, with respect to the sheet of plastic material, as well as the valves 27 and 57 controlling the gaseous fluid feeding of the injection devices of the punches and of the dies.

At least in the example shown, this control device further comprises valve 51 for controlling the ejection device, and the electric switches 5 and 8 controlling respectively the driving of the sheet F of plastic material and the heating device for this sheet F.

It is to be noted that the installation does not comprise any heating device for the molds and in particular for the dies. In fact, the dies are used at low temperature, ambient temperature or even lower temperatures near 0° C. to enable the rapid cooling of the formed container.

The operation of the installation described above is as follows:

At the beginning of the manufacturing cycle, that is to say in the rest position of the installation, the different devices of the installation are in the following locations or conditions:

The mold-carrying blocks 11 and 12 are maintained in withdrawn inactive position by means of the jacks 13, 14, respectively, the corresponding chambers of which are put under pressure by means of the valves 17, 18, respectively.

The radially movable container wall defining segments of the dies are in their open expanded position and the injection devices of the plugs as well as of the dies have their valves 28 and 57 closed so that they are not fed with gaseous fluid.

The heating devices 7 and the driving device for the sheet F of plastic material are switched off, the electric switches 8 and 5 being open.

However, in this rest condition of the installation, the sources of pressurized fluid, 19 and 27 are pressurized.

From this rest condition of the installation, the following successive operations are necessary for the formation of containers of plastic material:

(1) The heating of the sheet of plastic material (FIG. 4): The operator closes the switch 8 energizing the heating device. One portion of the sheet of plastic material is thus heated to a temperature such that it becomes readily deformable. This temperature is determined as a function of the plastic material used, as well as of the shape of the container to be formed. When this temperature is reached, the operator opens switch 8 de-energizing the heating device.

(2) The driving of the sheet of plastic material (FIG. 5): The operator closes switch 5 energizing electric motor 4 and roller 3 which moves sheet F. As soon as the heated portion of the sheet F is located between the plugs and the dies, the operator opens the switch 5 stopping movement of the said sheet F.

(3) The driving of the female mold-carrying block 12: The operator reverses the direction of flow of the driving fluid of the double acting jack 14, by means of valve 18, which causes forward movement of the female mold-carrying block. The flow rate of the driving fluid is adjusted in order that feeding can be done at a high speed.

During their displacement the frontal faces of the segments 30 of the dies come into contact with the colsure plate 54 which effects the closing of the dies as described hereabove. At the end of the forwarding stroke of the female mold-carrying block 12 this closure plate 54 is in contact with the sheet of plastic material F.

Figure 9:
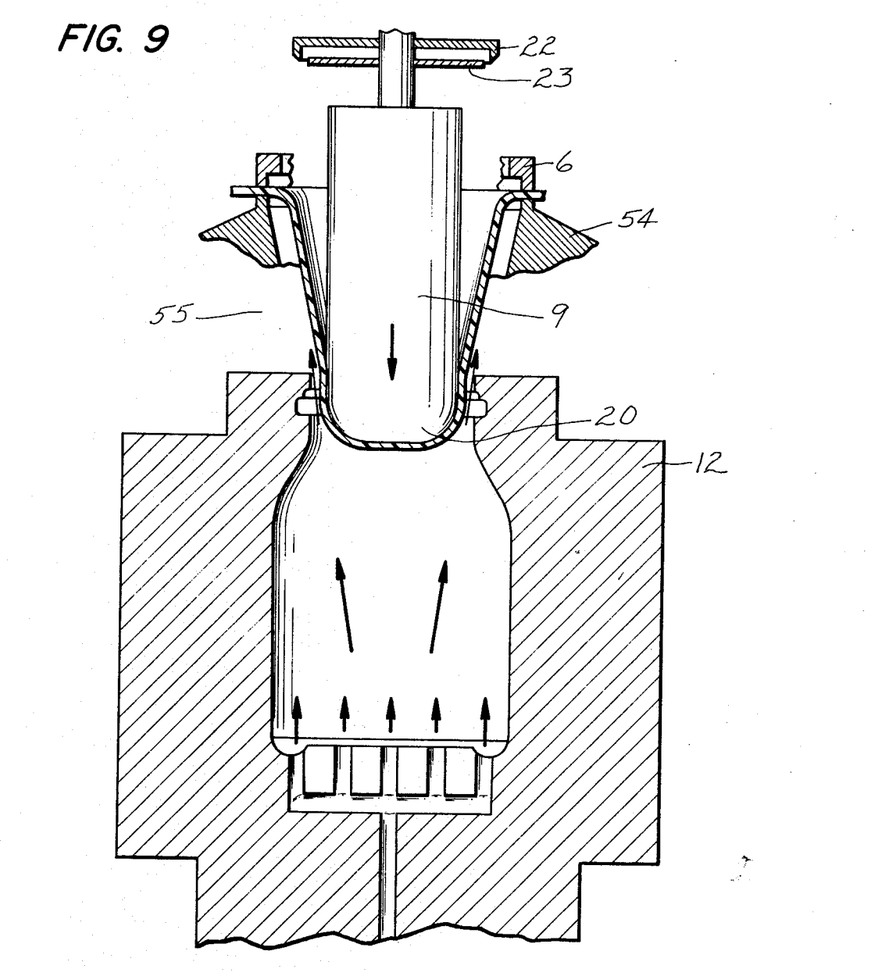
FIG. 9 is a schematic drawing illustrating the stretching and application of the sheet to the plug surface during the initial stages of one embodiment.

In the embodiment illustrated schematically in FIG. 9, however, closure plate 54 does not contact the front face of the die, and space 55 is provided between the die and the closure plate 54. It is essential in the present invention that provisions be made to permit gas to escape between the die and the side of the sheet facing the die during a subsequent forming step in the process to be hereinafter described. When radially movable wall defining portions or segments 30 are used, there is generally sufficient clearance between the movable segmented members 30 to permit gaseous escape, but space or gap 55 is otherwise essential. The term "vented" with respect to the die means any die provisions which will permit the gaseous fluid to escape therefrom, either by spacing the sheet from the die mouth, or by utilizing segmented parts wherein sufficient leakage occurs between the movable segments to maintain the required flow of gaseous fluid.

(4) The forward stroke of the male mold-carrying block (FIG. 6): Before the female mold-carrying block 12 reaches the end of its forward stroke, the operator reverses the direction of flow of the driving fluid of the double acting jack 13, by means of valve 17, which effects the forward stroke of the male mold-carrying block 11. The operator always controls the rate of flow of the driving fluid by means of the valve 17 so that the forward movement of the male mold-carrying block takes place initially at a low speed, then accelerates to reach a high speed at the end of the stroke.

Figure 7:
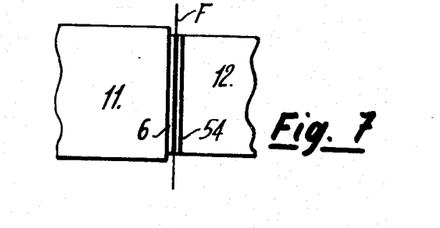

(5) The forming of the container (FIGS. 7 and 9):

(a) During its forward stroke, the male mold-carrying block 11 causes the introduction of the plug or punch 9 inside the die 10. However, before it is introduced in the die, the plug comes into contact with the sheet of plastic material F and deforms it mechanically locally.

(b) Simultaneous with this mechanical local deformation of the sheet F or after it reaches an axial amplitude which may be between a few millimeters and a few centimeters, the operator opens the valve 57 causing the feeding of gaseous fluid to the injection device for introducing gaseous fluid into the die. As typically shown in FIG. 9, this fluid acts to apply the plastic material across the surface of the plug in a direction opposite to that of the advancing plug. Because of gap 55 or the clearances between segmental members 30, the fluid introduced through the die to achieve this application of the plastic to the plug surface vents more or less freely to the surroundings, so that the pressure in the die does not appreciably increase because of the advancing plug. The operator controls the flow rate of this gaseous fluid through valve 57 at all times so that a flow rate is maintained on the die side of sheet F between the plastic material and the walls of the cavity of the die. During this critical phase of the forming, the plastic material is stretched between the plug and the outside gaseous cushion. As it is applied to the plug surface, the combination of the pressure exerted by the gaseous fluid in a direction opposite to the moving plug, together with the surface characteristics of the punch tends to set the material on contacting the punch surface and tends to inhibit sheet slippage across the punch. The extent of this action may be varied by varying the die pressure between about 3 to 75 p.s.i.g., preferably 5 to 40 p.s.i.g. This gaseous fluid flow also moves the stretching sheet inward toward the plug surface and away from the entry edge of the die during the axial plug movement. As the pressure increases this movement increases and thereby the overall weight of the finished container may be increased. Lower pressures provide a milder action and a lower container weight. Finally, this die pressuer serves to keep the stretching sheet away from the die interior.

(c) When the punch is introduced a substantial distance into the die, the container has been partially formed, because of the stretching action of the die fluid applying the sheet to the plug. The operator then opens the valve 28 causing feeding of gaseous fluid to the injection device of the plug, reverses the valve 57, and thus connects the gaseous fluid injection device of the die to discharge. The gaseous fluid preferably flows out of the plug close to its base line as illustrated in FIG. 2 and moves downwardly along its side, so as to evenly strip the plastic material away from the face of the plug head and apply it against the wall of the die by means of the pressure of this inner gaseous cushion produced by the injection device of the punch. This terminates the forming of the container. A time is allowed to elapse enabling the cooling of the formed container. This cooling is very rapid since the die is cold, and the heat of the plastic material is therefore very rapidly dissipated.

(6) The separation of the formed container from the sheet of plastic material: When the punch is introduced into the die, the spring biased clamping ring 23 is resiliently axially pushed back so as to abut against the frontal face of this die, thus uncovering the edge of the circular knife 22 which then comes in contact with the sheet overlying the frontal face of the die. The formed container is thus accurately separated from the sheet of plastic material. During this time, die sealing is insured by the spring biased clamping ring 23.

Figure 8:
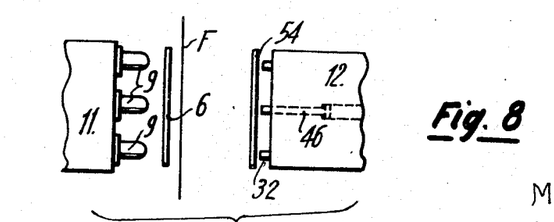

(7) The withdrawal of the male and female mold-carrying blocks (FIG. 8): Once the forming is terminated, the operator closes valve 28, interrupting the feeding of fluid to the injection device of the punch. Then he reverses the driving fluid feed of the double acting jacks 13, 14, by means of valves 17, 18, so as to effect the withdrawal of the mold-carrying blocks 11 and 12. Always by means of valves 17, 18 the operator controls the flow rate of the driving fluid to that the withdrawal of the mold-carrying blocks 11, 12 is effectuated at high speed.

(8) The ejection of the formed container: During the withdrawal of the female mold-carrying block, contact is broken between the closure plate 54 and the frontal faces of the segments 30 of the die, which then expand radially under the action of the springs 36, 37. This radial expansion of portions of the die makes it possible to free the formed container even if it has countersunk or reverse angle portions, without necessitating a complete separation either in an axial or radial direction, of the full die cavity. When the female mold-carrying block 12 is at the end of its withdrawal stroke, the operator opens valve 51 thus feeding the ejection device with fluid under pressure, which effects the ejection of the formed container out of the die. The manufacturing cycle of a container is then terminated and a new cycle identical to the one just described may start.

It is evident that some of the operations described hereabove as being successive could overlap, at least partially, in order to reduce the duration of the manufacturing cycle, as long as it does not affect the quality of the formed containers. The described sequence of the operations could also be modified. It is also apparent that many of the operations described above could be carried out automatically rather than manually, by conventional means well-known in the art.

Figure 10:
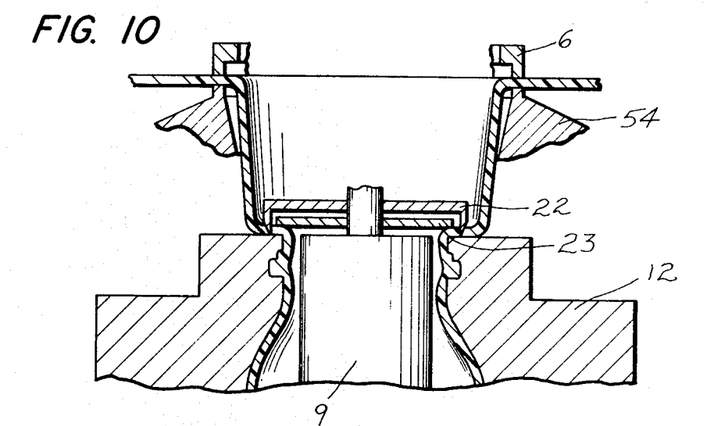
FIG. 10 is a schematic drawing illustrating the cutting and sealing of the sheet subsequent to the step of FIG. 9.
Figure 11:
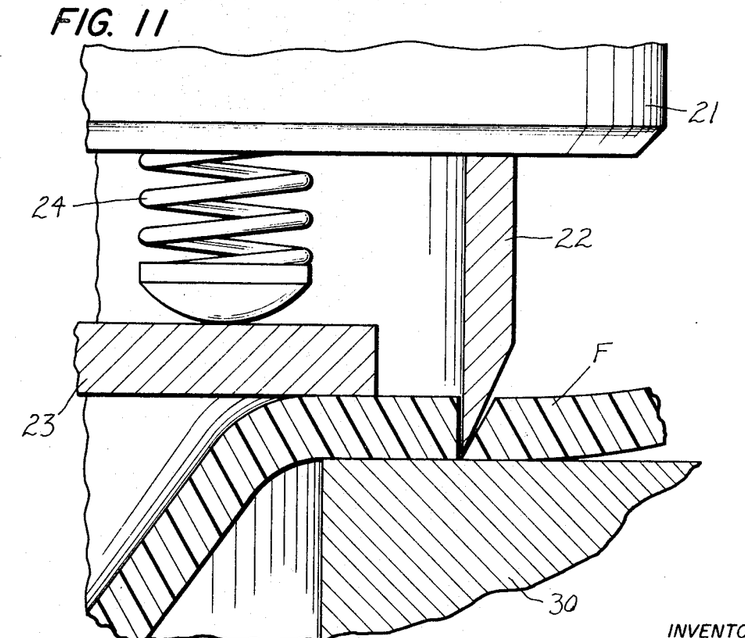
FIG. 11 is a schematic view in expanded form of the clamping and severing mechanism of the present invention.
Figure 12:
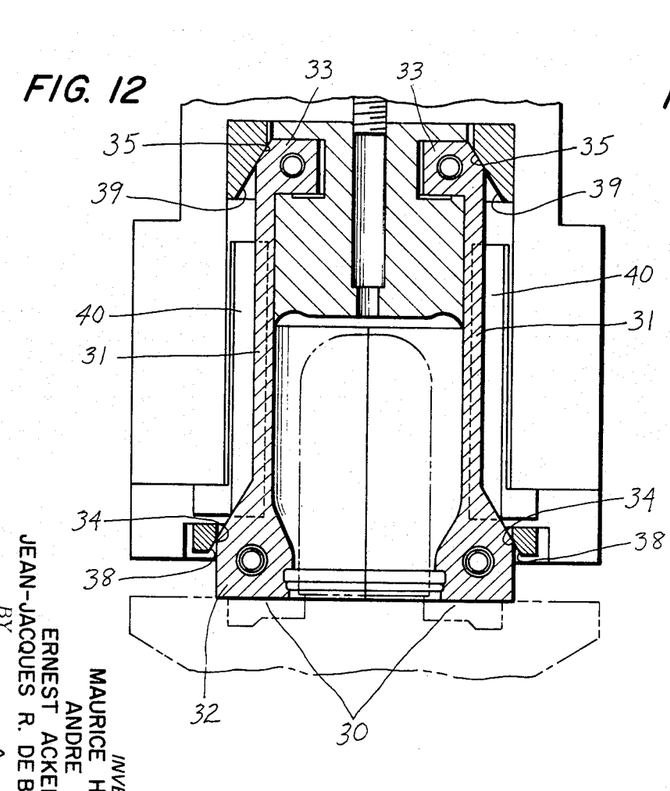
FIGS. 12 and 13 are schematic views partially in section taken in an axial direction illustrating the two positions of the radially movable die wall segments.
Figure 13:
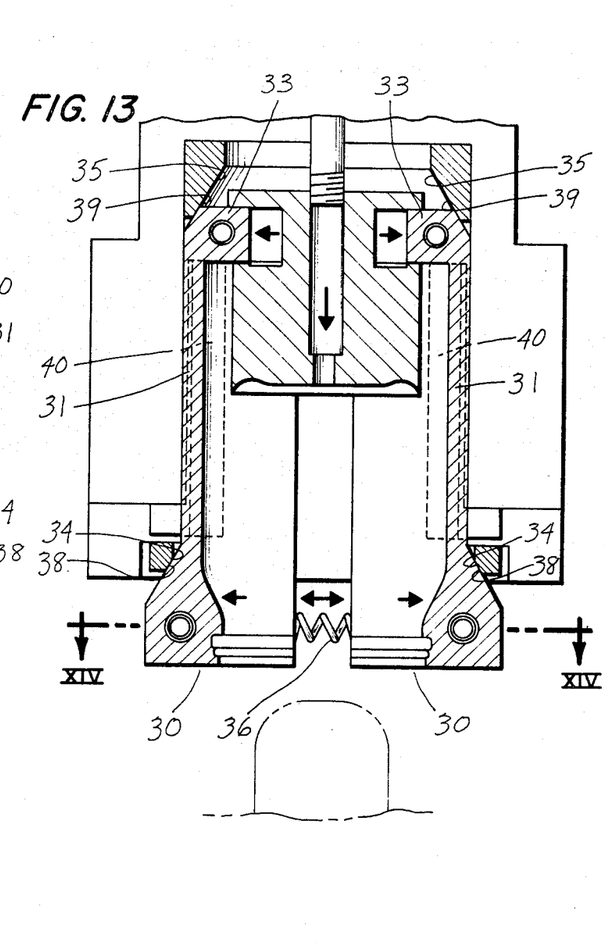

Embodiments of the thermoforming installation have been described by way of non-limiting examples, but it is obvious that numerous variations could be made without departing from the scope of the appended claims. For example, a die could be used without radially movable segments as schematically illustrated in FIGS. 9 and 10, in cases where containers without countersunk or reverse angle portions are being formed. Furthermore, the amplitudes and the speeds of the relative displacements between the plugs and the corresponding dies may be varied depending on the plastic material used and on the shape of the containers formed. The ejection device could be either mechanical or hydro-mechanical. A further variation of the installation could comprise a cooling device for the dies.

The gaseous fluid used is generally air. However, according to the application and the composition of the plastic material used, this gaseous fluid could be, for example, an inert gas or any other desired gaseous mixture.

It is critically important that the die be vented during the portion of the cycle when gaseous fluid is emanating from it, in order to maintain the pressure within the die during this portion of the cycle, between about 3 to 75 p.s.i.g., preferably 5 to 40 p.s.i.g. prior to introduction of gaseous fluid into the punch.

It is preferred in the present invention that the surface of the plug be maintained at an essentially constant temperature between about 40° F. to 100° F. without any local overheating, and be of a material having low heat transfer characteristics, in order to aid in the control of sheet slippage across the face of the plug head during forming at different pressures. The free deforming end of the punch may vary with the shape of the container being formed any may, for example, be flat or hemispherical.

To adequately strip the plastic from the punch surface during final formation of the container, it is important that pressure be introduced on the plug side of the sheet in excess of that within the die at the time. The pressure range of the plug side fluid is generally between about 10 to 100 p.s.i.g. and preferably 20 to 60 p.s.i.g. However the pressure on the plug side should at least be 4 p.s.i.g. higher than in the die. Application of a vacuum to the die is generally not adequate to peel and stretch the partially formed container off of the plug surface into sharp contact with the die well.

The above-described method of manufacturing containers has the following main advantages with respect to existing manufacturing methods:

(1) Production of containers having thin walls and a constant thickness with the ability to reach 0.1 millimeter.

(2) Production of containers having cylindrical or reversed frusto-conical shapes or countersunk portions of any shape, with inscriptions, imprints, etc.

(3) Production of finished containers without die resettings, with separation of the formed containers from the sheet of plastic material being achieved during the container forming cycle.

(4) Realization of a very high stretching rate of the plastic sheet. In fact, due to the constancy of the thickness of the container walls, it is possible to approach use of the exact quantity of plastic material required for a container.

Tests conducted have shown that with the aid of the method and the installation described, it is possible to produce containers having, for example, dimensions such as the following:

|  | mm. |
|---|---|
| Diameter of the neck of the container | 41 |
| Diameter of the bottom of the container | 60 |
| Height of the container | 115 |
| Thickness of the walls of the container | 0.4 |

What is claimed is:

1. A method of forming a container having a laterally extending undercut wall portion, comprising the steps of:
    (a) applying longitudinally acting forces directly against end portions of four container side wall defining segments of substantially equal circumferential length within a die well, against opposing tangentially applied forces tending to separate said segments and to increase the circumference of a cavity formed by said segments, thereby causing relative sliding longitudinal movement of one of (a) the four segments and (b) walls of the die well, with respect to the other, which simultaneously causes said segments to move substantially uniformly circumferentially toward each other in a radial direction against a laterally fixed container base defining portion within the die well for a distance approximately equal to the lateral extent of the undercut wall portion to define a cavity conforming to the container configuration;
    (b) moving a punch against a portion of a thermoplastic sheet in a moldable state to draw said sheet portion through the mouth of the die well and into said container conforming cavity to partially form said container;
    (c) introducing a pressurized gaseous fluid between said punch and the partially formed container to expand the partially formed container against the walls of the container conforming cavity, thereby finally forming said container;
    (d) removing said longitudinally directed forces to permit said opposing tangentially applied forces to move said segments substantially uniformly circumferentially apart in a radial direction within the die well away from the container base defining portion while the finally formed container is situated therein, said segments moving apart a distance at least equivalent to the extent to which said segments were moved together, whereby all points of the cavity conforming to the container configuration and defined by said segments move rapidly, substantially equally and uniformly outwardly away from the outer circumference of the container, thereby eliminating container orienting problems with respect to the travel of the container defining cavity wall from a just formed container at a temperature which would cause the container to stick to the cavity wall during opening of the cavity, said last mentioned movement also permitting ejection of the finally formed container from the cavity; and
    (e) forcing said finally formed container from the cavity through the mouth of the die well while retaining the segments and the container base defining portion within the die well.

2. The method of claim 1 wherein movement of the die segments is substantially equivalent to the difference in a radial direction between the widest and narrowest portions of the container body.

3. A method of forming a thin-walled container of thermoplastic material comprising the steps of:
    (a) clamping a sheet of moldable thermoplastic material between a punch and a die by clamping means defining a portion of the material from which a container is to be formed, said die being vented to permit passage of gaseous fluid therefrom, and having a cavity shape corresponding to that of the container;

(b) mechanically deforming said portion of the sheet by moving a punch toward said die and into contact with said clamped sheet;

(c) introducing a continuous flow of gaseous fluid into said die cavity to create a pressurized zone therein between about 3 to 75 p.s.i.g. only after the punch has engaged the sheet, to progressively apply the plastic material against said punch by means of said pressure before the punch completely enters said die;

(d) introducing a gaseous fluid under pressure between the outer surface of the sides of said punch and the partially formed container, while restricting fluid introduction through the entry end of said punch and while relieving the pressure in said cavity to uniformly strip the partially formed container from the plug surface and permit expansion of said partially formed container against the die wall;

(e) advancing toward said die cavity on a longitudinally movable support, a clamping mechanism resiliently biased in the direction of movement and positioned in front of a fixedly mounted cutting edge on said support; and (f) clamping a portion of said sheet by means of said resiliently biased clamping mechanism, against the frontal face of the die within the area defined by the aforementioned clamping means while continuing movement of said longitudinally movable support to increase the compression of said resiliently biased clamping mechanism against said resiliently clamped sheet portion and to advance said cutting edge beyond said clamping mechanism and into said resiliently clamped portion of the sheet to separate said resiliently clamped portion of the sheet from the remainder thereof during the container forming stroke of the punch.

4. A method of forming a thin-walled container of thermoplastic material having a varying cross section, comprising the steps of:

(a) heating a sheet of thermoplastic material to a moldable state;

(b) positioning the sheet of material between a punch and a die, said die comprising four movable container side wall defining segments of substantially equal circumferential length and a container base defining potrion having a fluid passageway therein;

(c) clamping said sheet by clamping means defining an area of material from which a container is to be formed;

(d) moving within said die each of said container side wall defining segments toward each other in a lateral direction against opposing tangentially applied forces tending to separate said segments and to increase the circumference of a cavity formed by said segments and the container base defining portion while keeping said container base defining portion fixed with respect to the mouth of the die, said movement being achieved by means of an actuating system adjacent the die to define a first cavity position having a shape corresponding to that of the varying cross sectioned container;

(e) moving the punch toward the die and into contact with said sheet area to mechanically deform said area of said sheet;

(f) introducing a continuous flow of gaseous fluid into said first cavity to create a pressurized zone therein between about 3 to 75 p.s.i.g., only after the punch has engaged said sheet to progressively apply the plastic material against said punch by means of said pressure before the punch completely enters the die;

(g) introducing a gaseous fluid under pressure between said punch and the partially formed container, while relieving the pressure in said first cavity to permit expansion of said partially formed container, a portion of said partially formed container being permitted to expand laterally in relation to the longitudinal axis of the punch a greater distance than the lateral dimension of the die mouth to form the varying cross sectioned container;

(h) moving within said die each of said container side wall defining segments substantially uniformly circumferentially away from each other in a lateral direction by means of said opposing tangentially applied forces, while keeping said container base defining portion fixed with respect to the mouth of the die to define a second cavity position, whereby all points of the cavity conforming to the container configuration and defined by said first cavity position move rapidly, substantially equally and uniformly outwardly away from the outer circumference of the container, thereby eliminating container orienting problems with respect to the travel of the container defining cavity wall from a just formed container at a temperature which would cause the container to stick to the cavity wall during opening of the cavity, said last mentioned movement also permitting the varying cross sectioned container to be ejected through the die mouth; and (i) introducing a pressurized fluid through the passageway in the base portion against the outer surface of the container base to force the container through the mouth of the die.

5. A method of forming a thin walled container of thermoplastic material comprising the steps of:

(a) moving a punch against a portion of a thermoplastic sheet in a moldable state to draw said sheet portion into a die cavity to partially form said container;

(b) advancing toward said die cavity on a longitudinally movable support, a clamping mechanism resiliently biased in the direction of movement and positioned in front of a fixedly mounted cutting edge on said support;

(c) clamping a portion of said sheet by means of said resiliently biased clamping mechanism, against the frontal face of the die within the area defined by the aforementioned clamping means while continuing movement of said longitudinally movable support to increase the compression of said resiliently biased clamping mechanism against said resiliently clamped portion and to advance said cutting edge beyond said clamping mechanism and into said resiliently clamped portion of the sheet to separate said resilienttly clamped portion of the sheet from the remainder of the sheet during the container forming stroke of the punch; and (d) introducing a pressurizing gaseous fluid between said punch and the partially formed container to expand the partially formed container against the wall of the die cavity to finally form the container.

References Cited

UNITED STATES PATENTS

| | | | |
|---|---|---|---|
| 3,011,212 | 12/1961 | Marshall et al. | 264—90 |
| 2,962,758 | 12/1960 | Politis | 264—94 |
| 2,973,558 | 3/1961 | Statton | 264—89 |
| 3,041,669 | 7/1962 | Marshall et al. | |
| 3,167,104 | 1/1965 | Wiley et al. | |
| 3,172,159 | 3/1965 | Edwards | 18—19 |

FOREIGN PATENTS

| | | |
|---|---|---|
| 1,238,420 | 6/1960 | France. |

ROBERT F. WHITE, Primary Examiner

T. J. CARVIS, Assistant Examiner

U.S. Cl. X.R.

18—19; 264—93